(12) United States Patent
Tsai et al.

(10) Patent No.: US 12,174,758 B2
(45) Date of Patent: Dec. 24, 2024

(54) COMPUTER SYSTEM HAVING MULTIPLE NODES WITH FLEXIBLE CONFIGURABLE ARCHITECTURE

(71) Applicant: Quanta Computer Inc., Taoyuan (TW)

(72) Inventors: Han-Chuan Tsai, Taoyuan (TW); Wei-Hung Lin, Taoyuan (TW); Yen-Ping Tung, Taoyuan (TW); Sz-Chin Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 133 days.

(21) Appl. No.: 18/156,251

(22) Filed: Jan. 18, 2023

(65) Prior Publication Data

US 2024/0193104 A1 Jun. 13, 2024

Related U.S. Application Data

(60) Provisional application No. 63/386,969, filed on Dec. 12, 2022.

(51) Int. Cl.
*G06F 13/16* (2006.01)

(52) U.S. Cl.
CPC .. *G06F 13/1652* (2013.01); *G06F 2213/0016* (2013.01); *G06F 2213/3808* (2013.01)

(58) Field of Classification Search
CPC .... G06F 9/4411; G06F 9/4415; G06F 9/4416; G06F 9/445; G06F 9/44505;
(Continued)

(56) References Cited

U.S. PATENT DOCUMENTS

| 2017/0031431 A1* | 2/2017 | Khatri | G06F 1/3246 |
| 2019/0286590 A1* | 9/2019 | Chou | G06F 13/362 |

(Continued)

FOREIGN PATENT DOCUMENTS

| CN | 103995575 A | 8/2014 |
| CN | 104168127 A | 11/2014 |

(Continued)

OTHER PUBLICATIONS

TW Office Action for Application No. 112127517, mailed Dec. 25, 2023, w/ First Office Action Summary, 1 p.
(Continued)

*Primary Examiner* — Raymond N Phan
(74) *Attorney, Agent, or Firm* — NIXON PEABODY LLP (57) ABSTRACT

A system and method for a configurable computer system architecture is disclosed. The computer system architecture includes a power distribution board including a configuration identification strapping. The architecture includes a first node having a first processor and a first baseboard management controller (BMC) coupled to the power distribution board via an internal communication channel. A second node, identical to the first node, has a second processor and a second BMC coupled to the power distribution board via the internal communication channel. The configuration identification strapping is one of a first configuration readable by the first and second BMCs with two nodes operating as independent devices, or a second configuration readable by the first and second BMCs with two nodes operating as a single device. The first BMC serves as a master BMC and the second BMC serves as a slave BMC in the second configuration.

19 Claims, 6 Drawing Sheets (58) Field of Classification Search
CPC ........ G06F 13/362; G06F 13/36; G06F 13/38; G06F 13/382; G06F 13/385; G06F 13/387; G06F 13/40; G06F 13/4004
See application file for complete search history.

(56) References Cited

U.S. PATENT DOCUMENTS

| | | | |
|---|---|---|---|
| 2020/0110454 A1* | 4/2020 | Yang | H02J 7/34 |
| 2021/0157609 A1* | 5/2021 | Goel | G06F 11/3044 |
| 2021/0255681 A1* | 8/2021 | Olarig | G06F 13/1668 |
| 2021/0320490 A1* | 10/2021 | Lin | H05K 7/20763 |
| 2022/0408590 A1* | 12/2022 | Cheng | G06F 1/20 |

FOREIGN PATENT DOCUMENTS

| | | | |
|---|---|---|---|
| CN | 105912498 A | | 8/2016 |
| CN | 111459751 A | | 7/2020 |
| CN | 113204375 A | | 8/2021 |
| CN | 114356725 A | | 4/2022 |
| TW | 201738766 A | | 11/2017 |

OTHER PUBLICATIONS

TW Search Report for Application No. 112127517, mailed Dec. 25, 2023, w/ First Office Action, 12 pp.

* cited by examiner

COMPUTER SYSTEM HAVING MULTIPLE NODES WITH FLEXIBLE CONFIGURABLE ARCHITECTURE

PRIORITY CLAIM

The present disclosure claims the benefit of, and priority to U.S. Provisional Application No. 63/386,969, filed on Dec. 12, 2022. The contents of that application are hereby incorporated by reference in their entirety.

TECHNICAL FIELD

The present disclosure relates generally to computer systems having multiple processors. More particularly, aspects of this disclosure relate to a computer system architecture having the flexibility to support different configurations of identical modular nodes.

BACKGROUND

Servers are employed in large numbers for high demand applications, such as network-based systems or data centers. The emergence of the cloud for computing applications has increased the demand for data centers. Data centers have numerous servers that store data and run applications accessed by remotely connected, computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Each of the servers generally includes a baseboard management controller that manages the operation of the server, as well as communicating operational data to a central management station that manages the servers of the rack.

In general server architecture, one node will include one or two CPUs and a baseboard management controller (BMC) that performs server management such as monitoring power and temperature and performing startup operations. However, in cases where a more powerful system is desired, expanding the system configuration to four CPUs or eight CPUs is desired. However, such expansion is difficult because the hardware design for a two CPU node is fixed. Thus, creating an 8S system with eight CPUs or a 4S system with four CPUs from a basic two CPU node is a challenge that requires specialized hardware for the architecture.

Thus, there is a need for a computer system architecture that allows use of the same hardware for system with different numbers of processors. There is another need for an architecture that may use a simple mechanism on a common power distribution board to configure different nodes.

SUMMARY

One disclosed example is a configurable computer system architecture including a power distribution board having a configuration identification strapping. The architecture includes a first node having a first processor and a first baseboard management controller (BMC) coupled to the power distribution board via an internal communication channel. A second node, identical to the first node, has a second processor and a second BMC coupled to the power distribution board via the internal communication channel. The first and second BMCs are configurable for different configurations read from the configuration identification strapping. The configurations include a first configuration with the first and second nodes operating as independent devices, where the first and second BMC serve as master BMCs. The configurations include a second configuration with two nodes operating as a single device, where the first BMC serves as a master BMC and the second BMC serves as a slave BMC.

A further implementation of the example system is an embodiment where the first and second nodes each include a mother board including dual in line memory modules (DIMM)s accessible by the first or second processor. Another implementation is where the first and second nodes each include an additional processor on the mother board. Another implementation is where the first and second BMCs are mounted on data center-ready secure control module (DC-SCM) boards. Another implementation is where the computer system architecture includes a third node identical to the first node. The third node has a third processor and a third BMC coupled to the power distribution board via the internal communication channel. The computer system architecture includes a fourth node identical to the first node. The fourth node has a fourth processor and a fourth BMC coupled to the power distribution board via the internal communication channel. The configuration identification strapping may include a third configuration readable by the first, second, third, and fourth BMCs. The third configuration is four nodes operating as a single device, where the first BMC serves as a master BMC and the other BMCs serve as slave BMCs. Another implementation is where the computer system architecture further includes a network interface. The BMCs are configurable to allow communication to an external device through the network interface. The master BMC is configured to allow communication through the network interface. The slave BMC is configured to not access the network interface. Another implementation is where the computer system architecture further includes firmware on each of the BMCs. The firmware of each of the BMCs defines the master BMC to perform host functions and CPU/DIMM management for the first and second nodes. The firmware defines the slave BMC to perform sensor monitoring of the second node. Another implementation is where the firmware on each of the BMCs reads the configuration identification strapping of the power distribution board when each BMC is powered on. The BMC defined as the master BMC controls the power on of each of the nodes. Another implementation is where the internal communication channel includes a BMC internal ethernet bus, a BMC inter-integrated circuit (I2C) bus, a CPU improved inter-integrated circuit (I3C) bus and a CPU Platform Environment Control Interface (PECI) bus. Another implementation is where the configuration identification strapping is one of an electrically erasable programmable read only memory, a general purpose input output (GPIO) pin, an input/output expander, a complex programmable logic device (CPLD), or a field programmable gate array (FPGA). Another implementation is where the computer system architecture further includes an inter-node communication bus coupling the first processor of the first node to the second processor of the second node.

Another disclosed example is a method of configuring a computer system including a power distribution board, and first and second identical nodes. The first and second nodes each include a baseboard management controller (BMC). Each of the BMCs is powered on. Each of the BMCs read a configuration from a configuration identification strapping on the power distribution board via an internal communication channel. Each of the BMCs are configured as a slave BMC or a master BMC based on the configuration identification strapping. The configuration may be a first configuration with the first and second nodes as independent devices and corresponding master BMCs; or a second configuration of a single device with the BMC of the first node as the master BMC and the BMC of the second node as the slave BMC. A mother board including processors of the first and second nodes are powered on via command of the configured master BMC or BMCs. A management function is performed via the master BMC for the configuration.

Another implementation of the example method is where the BMCs are mounted on data center-ready secure control module (DC-SCM) boards. Another implementation is where the computer system includes a third node identical to the first node. The third node includes a BMC. The computer system includes a fourth node identical to the first node. The fourth node includes a BMC. The configuration may be a third configuration with four nodes operating as a single device, where the BMC of the first node serves as a master BMC and the other BMCs serves as slave BMCs. Another implementation is where the BMCs are configurable to allow communication to an external device through the network interface. The master BMC is configured to allow communication through the network interface and the slave BMC is configured to not access the network interface. Another implementation is where the management function of the master BMC is a host function and CPU/DIMM management for all nodes of the device. Another implementation is where the method further includes the slave BMC performing a slave management function including sensor monitoring of the second node. Another implementation is where the internal communication channel includes a BMC internal ethernet bus, a BMC inter-integrated circuit (I2C) bus, a CPU improved inter-integrated circuit (I3C) bus, or a CPU Platform Environment Control Interface (PECI) bus. Another implementation is where the configuration identification strapping is one of an electrically erasable programmable read only memory, a general purpose input output (GPIO) pin, an input/output expander, a complex programmable logic device (CPLD), or a field programmable gate array (FPGA).

Another disclosed example is a computer system having a first node including a first processor and a first baseboard management controller (BMC). The computer system includes a second node identical to the first node, the second node including a second processor and a second BMC. The computer system includes a third node identical to the first node, the third node including a third processor and a third BMC. The computer system includes a fourth node identical to the first node, the fourth node including a fourth processor and a fourth BMC. A power distribution board provides power to the nodes and includes a configuration identification strapping. A chassis holds the nodes and the power distribution board. An internal communication channel allows communication between the BMCs and the power distribution board. The identification strap is readable by the BMCs to configure the computer system as: 1) four independent devices; 2) as a first device including the first node and the second node, and a second device including the third node and the fourth node, the first and second devices independent of each other; and 3) one device including the four nodes.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a hardware architecture design that is based on a building block of multiple 2S nodes (one system with two CPUs) having a mother board with the two CPUs connected to a data center-ready secure control module (DC-SCM) board. A BMC is mounted on the DC-SCM board for server management. The example hardware architecture may be configured for different products such as a 4S or 8S system. In the larger 8S/4S system configurations for different products or stock keeping units (SKUs), there are either two or four mother boards constituting multiple nodes. Each mother board is connected to a DC-SCM board with a BMC on the DC-SCM board to manage the system.

The example hardware architecture may support up to four nodes, each having the same mother board and DC-SCM board hardware design. The example architecture has the mother boards connected through a single power distribution (PDB) board. Since each DC-SCM board has one BMC, there will be up to four BMCs in the example architecture. A master-slave BMC mechanism is defined that designates the BMC of one node as the master BMC, and the other BMCs are defined as slave BMCs. The master BMC and slave BMC or BMCs are connected through the power distribution board by an internal communication bus such as a Gb Ethernet bus for communication of power data. The master BMC may provide notifications to the slave BMCs through the internal communication bus. During runtime, the master BMC can provide queries to the slave BMCs for sensor readings through the internal communication bus. The sensors may provide voltage, power, temperature for components on the mother board managed by the slave BMC through an I2C bus. The internal communication bus may also provide updates to firmware for any components. Based on platform design, all CPUs and corresponding memory (e.g., dual in line memory modules (DIMMs)) on the mother boards are connected through the power distribution board and are managed by the master BMC.

The software required for the example configurable hardware architecture is the same for each BMC. Thus, each BMC will use the same firmware image regardless of whether the BMC is the master BMC or the slave BMC. When system AC power is turned on, each of the BMCs can identify the system SKU and their specific role (master or slave) through hardware strapping from the power distribution board. The master BMC is responsible for executing initial hardware processes for configuration to different SKUs such as a 2S, a 4S or an 8S SKU. The master BMC then powers on the system. After initialization and system power on, the master BMC and slave BMC or BMCs start runtime for server management of their respective nodes. Thus, a single BMC firmware image can support 8S, 4S, and 2S server configurations in the same hardware architecture.

Figure 1A:
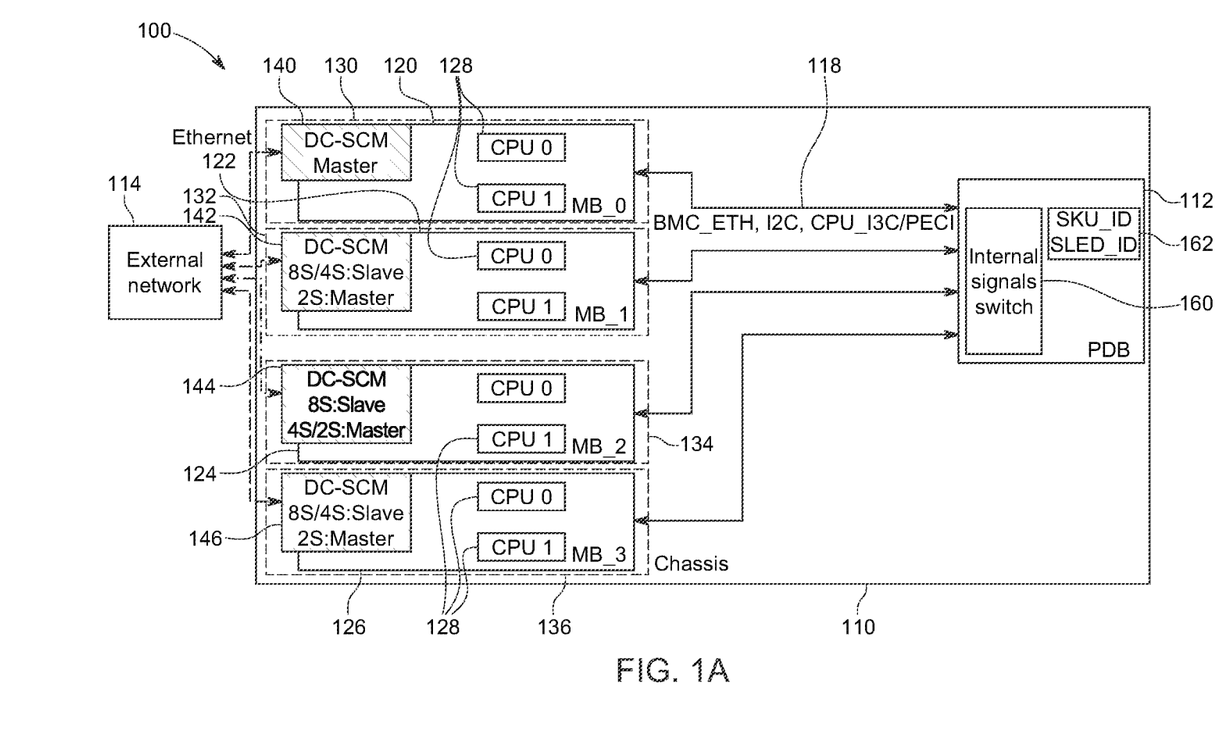
FIG. 1A is a block diagram of an example basic configurable architecture having identical nodes, according to certain aspects of the present disclosure.

FIG. 1A shows an example hardware architecture 100 that is based on a chassis 110 that can be configured to a 2S, a 4S, or an 8S type SKU. The chassis 110 has physical features to allow for the installation of a power distribution board 112 and up to four identical mother boards 120, 122, 124 and 126 that each constitute a respective node 130, 132, 134, and 136. Each mother board includes two central processing units (CPUs) 128 and a series of dual in line memory modules (DIMM)s that support the CPUs 128. Different chassis designs using the same principles of the example architecture 100 may accommodate different numbers of nodes and thus many different configurations of greater than 8S SKUs may be provided using identical nodes and a single power distribution board with configuration information. The example architecture 100 is designed for a server-based system that communicates with an external network 114. The external network 114 may be a LAN that allows a data center operator to obtain information on operation of the nodes in the architecture 100 as well as provide remote commands to the nodes through a master BMC of one of the nodes.

As will be explained, the chassis 110 may be configured for four 2S SKUs, two 4S SKUs, or a single 8S SKUs, using the same hardware nodes 130, 132, 134, and 136 and power distribution board 112. Each mother board 120, 122, 124 and 126 of the nodes 130, 132, 134, and 136 have respective datacenter-ready secure control module (DC-SCM) boards 140, 142, 144, and 146. A baseboard management controller (BMC) is mounted on each of the DC-SCM boards 140, 142, 144, and 146. Each of the nodes 130, 132, 134, and 136 have identical DC-SCM boards and mother boards. Each of the BMCs on the DC-SCM boards 140, 142, 144, and 146, are connected to the PDB 112 and each other via communication channels 118. The PDB 112 includes a power supply unit that allows external AC power to be connected. The PDB 112 includes support components such as a power controller, fans, and sensors, as well as a separate fan board, to provide power to the respective mother boards and BMCs of the nodes 130, 132, 134, and 136. As will be explained, the BMCs are powered on initially and control the power on of the components of the mother boards via the PDB 112.

The architecture 100 may employ a master/slave BMC arrangement to manage the nodes 130, 132, 134, and 136. Thus, in some configurations, one BMC serves as the master BMC while the BMCs of the other nodes serves as slave BMCs. In other configurations, none of the BMCs serve as slave BMCs. The communication channels 118 allows signals to be sent between the power distribution board 112 and the BMCs of the nodes 130, 132, 134, and 136. The communication protocols of the communication channels 118 may include BMC internal ethernet, BMC inter-integrated circuit (I2C), CPU improved inter-integrated circuit (I3C), CPU Platform Environment Control Interface (PECI), or any other protocol that allows communication between the PDB 112 to the components of the mother boards. The CPUs 128 and DIMMs of the nodes 130, 132, 134, and 136 are connected to each other through inter-node communication bus such as a CPU I3C and CPU PECI bus. The CPUs and DIMMs of each of the nodes are connected to the master BMC for CPU/DIMM management through the CPUs on the mother board of the master BMC. In this example, CPU I3C and CPU PECI buses are used to connect the CPUs and DIMMs with the CPUs and DIMMs of the other nodes. When the mother board of each node is powered on, the host CPU on the mother board will check the hardware strapping setting and perform CPU initialization by the BIOS. In each of the motherboards, the CPU and DIMMs have a PECI wire/I2C/I3C connection to the corresponding BMC. The BMC can query the CPU/DIMM information based on the platform design from the PECI/I2C/I3C connection. The BMC may then communicate this information to the other BMCs via the internal bus 118.

The communication channels 118 in this example may include a BMC internal ethernet (BMC I2C) used for master BMC and slave BMCs internal communication. The communication channels 118 may include an I2C bus used for power distribution board monitoring such as monitoring a power controller or sensors such as temperature or power sensors on the PDB 112. The communication channels 118 may be used by each BMC to check the strapping for the configuration (master or slave) of the specific BMC. The slave BMC can check the power status from the master BMC through queries sent through the communication channels 118.

The PDB 112 includes an internal signals switch 160 that receives signals from the BMC internal communication channels 118. The PDB 112 also includes a hardware strapping source 162 that includes a SKU identification (SKU_ID) that identifies the type of configuration of the architecture 100, and a sled identification (SLED_ID) that defines the role of the BMC on each of the nodes. Thus, the SKU identification identifies whether the configuration is for a 2S SKU, a 4S SKU or an 8S SKU in this example. The sled identification includes a value for each of the nodes indicating the role of the respective BMC. The hardware strapping source 162 may be non-volatile memory such as an electrically erasable programmable read only memory (EE-PROM), or another hardwired circuit, such as a general purpose input output (GPIO) pin, an input/output expander, a complex programmable logic device (CPLD), or a field programmable gate array (FPGA), that allows the desired type of configuration. The SKU identification and sled identification is read by each of the BMCs of the nodes 130, 132, 134, and 136 to identify the type of configuration (8S/4S/2S) and the role of the specific BMC in the configuration.

Figure 1B:
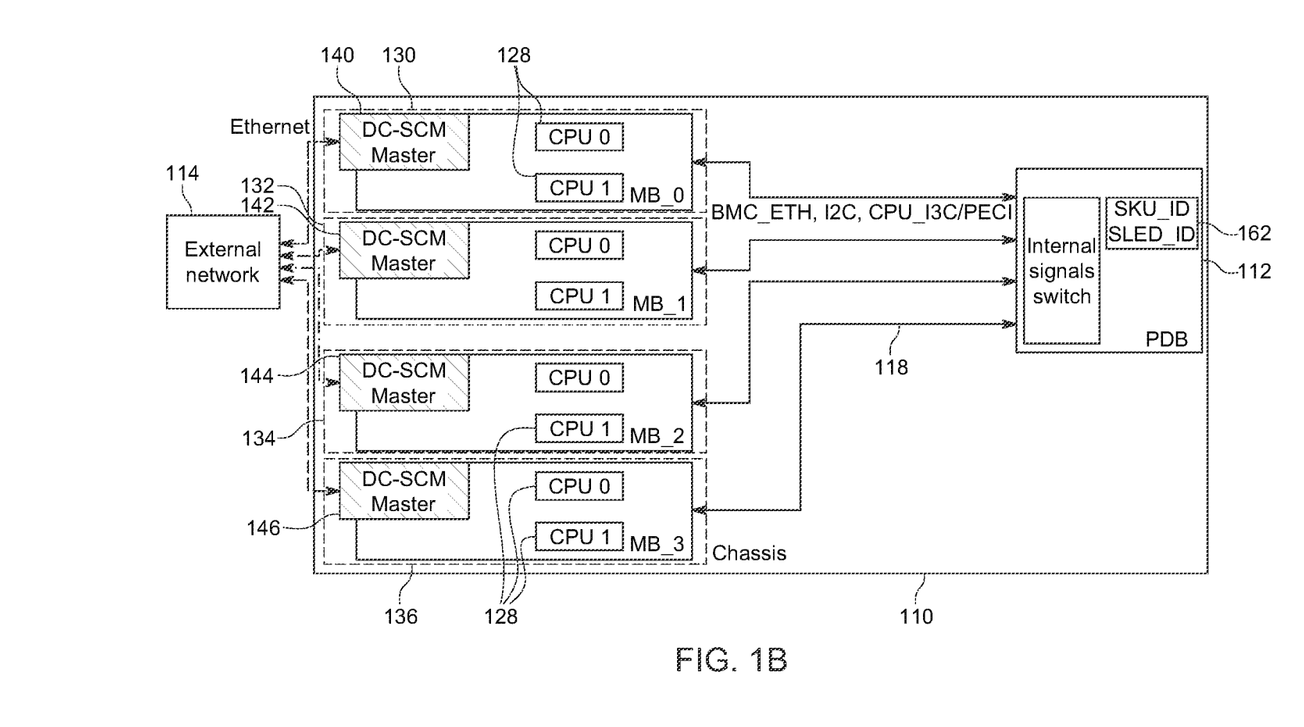
FIG. 1B is a block diagram of the example architecture in FIG. 1A configured for four 2S computer systems, according to certain aspects of the present disclosure.

FIG. 1B shows the configuration of the architecture 100 in FIG. 1A configured as an example four independent 2S SKU. In this example, this four 2S SKU configuration does not require the master/slave management mode explained above. In this configuration, each of the BMCs are a master node. Thus, the BMC on the DC-SCM board 140 of the mother board 120 serves as a master BMC for the node 130, which is one of the 2S SKUs. The BMCs on the DC-SCM boards 142, 144, and 146 also serve as a master BMC for the respective nodes 132, 134, and 136. The master BMCs on the DC-SCM boards 140, 142, 144, and 146 each have an external ethernet interface that is activated to connect to the external network 114. Since each of the BMCs on the DC-SCM boards 140, 142, 144, and 146 are master BMCs, there are no BMCs that serve as slave BMCs. In this configuration, each BMC is responsible for host functions, sensor monitoring, and monitoring for sensor polling and management of the CPU/DIMMs (e.g., temperature/voltage sensing, or handling power capping) for each of the respective nodes.

Figure 1C:
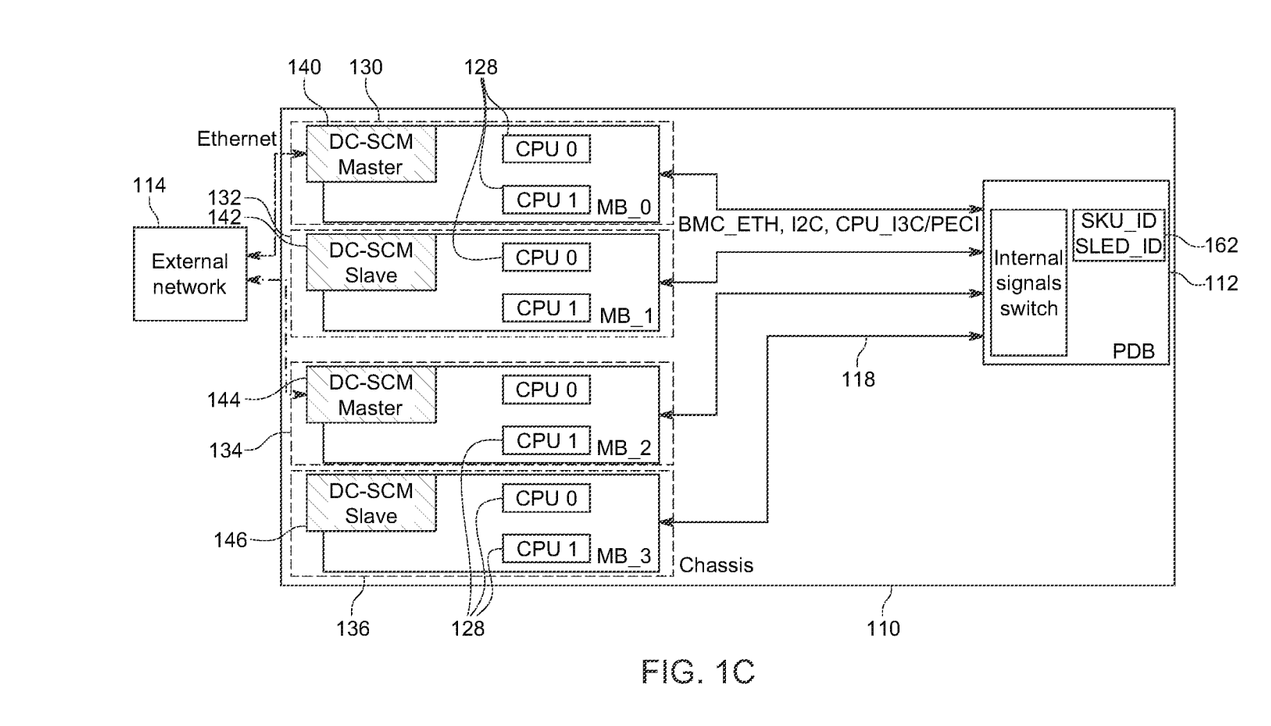
FIG. 1C is a block diagram of the example architecture in FIG. 1A configured for two 4S computer systems, according to certain aspects of the present disclosure.

FIG. 1C shows the architecture 100 in FIG. 1A configured as an example two independent 4S SKUs. This configuration incorporates the master/slave management mode with one master BMC and one slave BMC for both 4S SKUs. In this example, the BMC on the DC-SCM board 140 of the mother board 120 serves as one of the master BMCs. The other BMC on the DC-SCM board 142 serves as a slave BMC. Thus, the nodes 130 and 132 constitute one of the 4S SKUs of this configuration resulting in having four CPUs 128. The master BMC on the DC-SCM board 140 has an external ethernet interface that is activated to connect to the external network 114. The master BMC on the DC-SCM board 140 is responsible for host functions, sensor monitoring, and sensor polling and management of CPU/DIMMs for both nodes 130 and 132. In this configuration the slave BMC on the DC-SCM board 142 deactivates the network interface and thus is without an external ethernet connection. The slave BMC is responsible for the sensor monitoring of the node 132, except for CPU/DIMM and management of the node 132, as this function is performed by the master BMC on the DC-SCM board 140. Similarly, the BMC on the DC-SCM board 144 of the mother board 124 serves as the other master BMC and is connected to the network 114. The other BMC on the DC-SCM board 146 serves as a slave BMC. Thus, the nodes 134 and 136 constitute the other 4S SKU in this configuration.

Figure 1D:
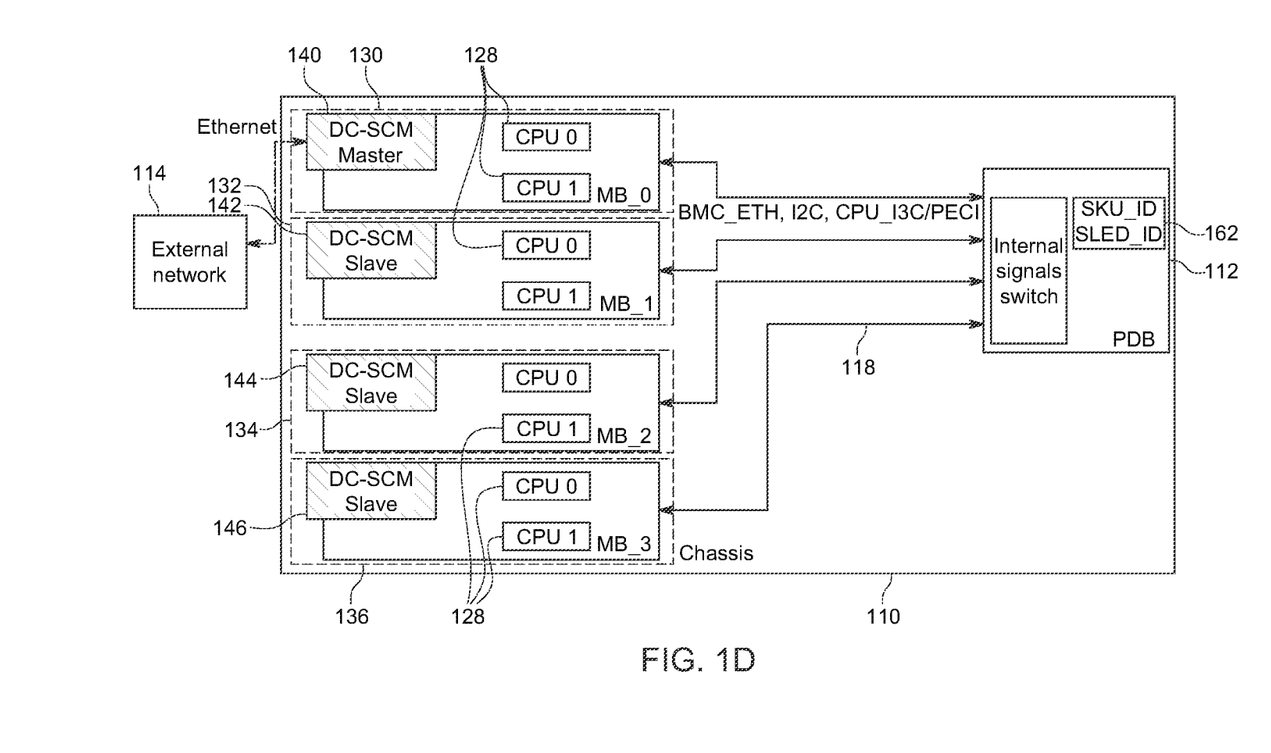
FIG. 1D is a block diagram of the example architecture in FIG. 1A configured for a single 8S computer system, according to certain aspects of the present disclosure.

FIG. 1D shows the architecture 100 in FIG. 1A configured as an example 8S SKU. This configuration includes a master/slave management mode with one master BMC and three slave BMCs. In this example, the BMC on the DC-SCM board 140 of the mother board serves as the master BMC. The other BMCs on the respective DC-SCM boards 142, 144, and 146 serve as slave BMCs. The master BMC on the DC-SCM board 140 has an external ethernet interface that is activated to connect to the external network 114. The master BMC is responsible for host functions, sensor monitoring, and sensor polling and management of CPU/DIMMs for all of the nodes 130, 132, 134, and 136. In relation to sensor polling and management of the CPU/DIMMs, the master BMC monitor all CPU/DIMM information from the host processor on the corresponding node 130. The host processor receives CPU/DIMMs information from the other nodes through the CPU I3C and CPU PECI connection in this example. Each of the slave BMCs on the DC-SCM boards 142, 144, and 146 deactivate the network interface and thus are without an external ethernet connection to the network 114. The slave BMCs are responsible for the sensor monitoring of the respective slave node 132, 134, and 136, except for CPU/DIMM and management of the slave nodes, as this function is performed by the master BMC.

Figure 2:
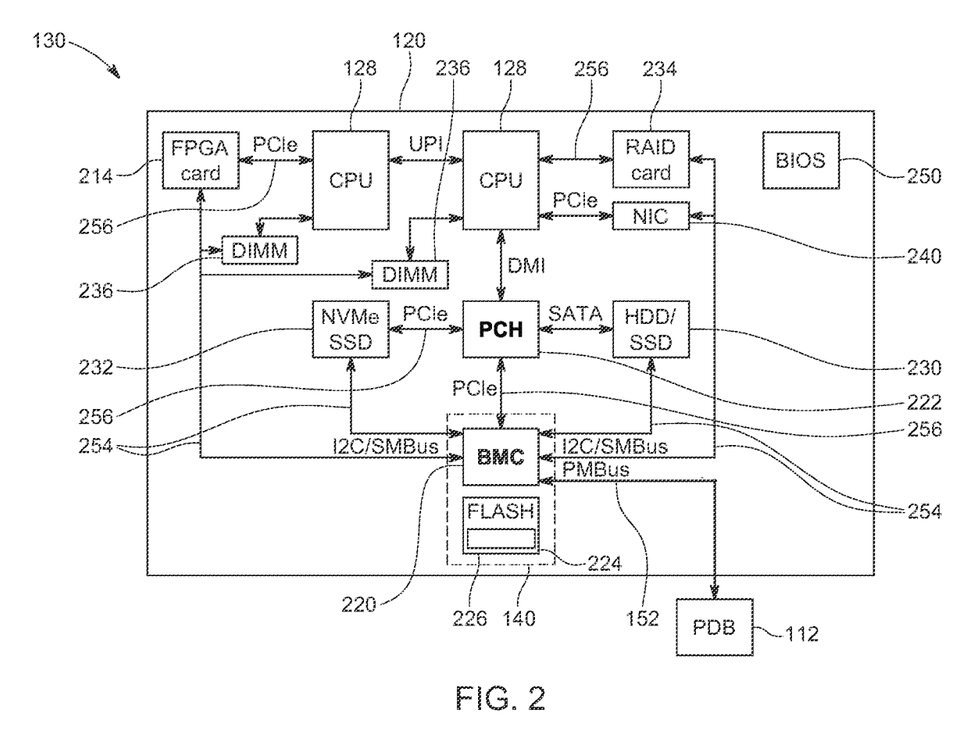
FIG. 2 is a block diagram of one of the nodes in the example architecture in FIG. 1, according to certain aspects of the present disclosure.

FIG. 2 is a block diagram of an example node, such as the node 130 in FIG. 1. The node 130 includes two CPUs 128 and 128 that execute computing operations and applications that are mounted on the mother board 120 in FIG. 1. Although only two CPUs are shown, additional CPUs may be supported by the node 130. Specialized functions may be performed by specialized processors such as a GPU or a field programmable gate array (FPGA) mounted on an FPGA card 214. The components on the node 130 are powered by the power distribution board 112. The operation of the node 130 is managed by a baseboard management controller (BMC) 220 that is mounted on the DC-SCM board 140. A platform controller hub (PCH) 222 assists in controlling data paths and support for the CPUs 128. The BMC 220 is coupled to a non-volatile memory 224 that stores BMC firmware 226. In this example, the non-volatile memory 224 may be flash memory, but any appropriate non-volatile memory may be used.

Other components include memory devices such as a SATA memory device 230 that may be an HDD or an SSD, a non-volatile memory express (NVMe) SSD 232, and a RAID card 234. The CPUs 128 may be supported by fast memory in the form of DIMMs 236. A network interface card (NIC) 240 provides communication to external devices through a network such as the network 114 in FIG. 1. A BIOS 250 is firmware used in a boot-up process after the node 130 is powered-on. The BIOS 250 includes routines that collect information from the hardware components when such components are initialized as part of the boot-up process of the node 130.

The node 130 includes different buses that allow data to be exchanged between the components in the node 130. The buses also allow the BMC 220 to receive status information from different components in the node 130. The buses include a power management (PM) bus 152 that allows communication with the power distribution board 112. An inter-integrated circuit protocol system management bus (I2C/SMBus) 254 may be used to exchange data between the BMC 220 and devices such as the FPGA card 214, the SATA memory 230, the NVMe memory 232, the RAID card 234, and the DIMMs 236. A peripheral component interconnect express (PCIe) bus 256 allows exchange of data between processing components such as the CPUs 128, the PCH 222, the PCIe devices such as the NVMe SSD 232, the NIC 240, the RAID card 234, the FPGA card 214, and the BMC 220. Corresponding software protocols are used by the respective buses 252, 254, and 256. Other hardware buses such as I3C, PECI, UART, USB, or RMII/RGMII may be used. Other software protocols such as MCTP, NC-SI, PLDM, DCMI, and self-defined protocols may be used.

Figure 3:
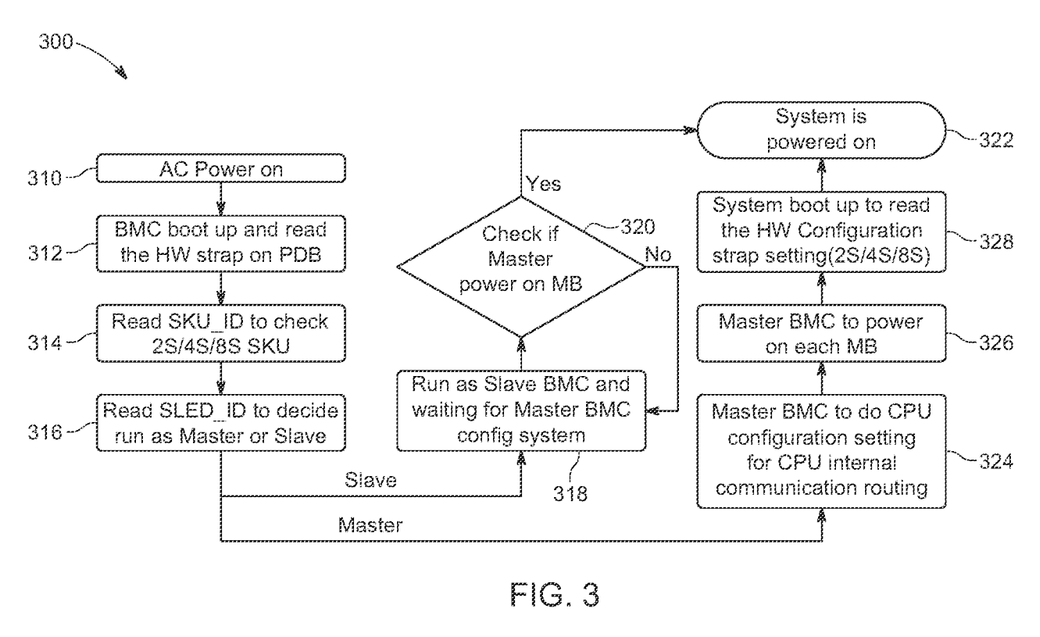
FIG. 3 is a flow diagram of an example routine to configure the BMCs in the example architecture for performing roles for a specific configuration, according to certain aspects of the present disclosure.

A flow diagram in FIG. 3 is representative of example machine readable instructions for the configuration of BMCs in the example architecture 100 in FIG. 1A. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine-readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 3 shows the routine executed by the firmware for each of the BMCs in the architecture 100 in FIG. 1. The AC power on sequence is first initiated (310). The BMC boots up in bootloader and reads the SKU_ID and SLED_ID from the hardware strapping 162 on the power distribution board 112 board (312). The routine reads the SKU identification from the SKU_ID from the hardware strapping 162 to determine the overall architecture configuration (314). The routine reads the SLED_ID from the hardware strapping 162 to determine whether the BMC is run as a slave or a master (316).

After checking the system SKU and the BMC role, if the BMC runs as a slave, the BMC waits for the master BMC to configure the system (318). After configuration, the routine then checks if the master BMC has powered on the mother board corresponding to the master BMC (320). If the power up has not occurred, the routine will loop back to waiting (318). If the power has been turned on, the routine will move to the state that the system is powered up. The slave BMC will boot the CPUs on the mother board corresponding to the slave BMC to run time (322) with the correct SKU for system management.

If the BMC is a master BMC (316), the BMC will perform CPU configuration setting for CPU internal communication routing (324). This configuration allows the CPUs on the nodes to communicate with each other. Thus, the master BMC will perform CPU configuration setting on an I/O expander such as the internal signals switch 160 on the power distribution board 112, that can decide CPU internal communication routing based on the configuration. After configuration setting is done, the master BMC can power on each mother board through communication to a mother board hot swap controller (HSC) on the mother board (326). The system boots to read the hardware configuration strap setting and then runs with the correct configuration (328). The master BMC will boot the CPUs on the mother board to run time (322) with the correct SKU for system management.

As explained above, when the configuration of the example architecture 100 is four 2S systems, each of the BMCs will be master BMCs and thus all follow blocks 324, 326, and 328 to power up their individual nodes. When the configuration is two 4S systems, the BMCs of the nodes 130 and 134 will be master BMCs and thus follow blocks 324, 326, and 328 to power up their respective nodes 130 and 134. The BMCs on the nodes 132 and 136 will be set as slave BMCs and wait for power up of the respective nodes 130 and 134 before powering up their respective nodes 132 and 136. When the configuration is one 8S system, the BMC of the node 130 will be the master BMC and thus follow blocks 324, 326, and 328 to power up the node 130. The BMCs on the nodes 132, 134, and 136 will be set as slave BMCs and wait for power up of the node 130 before powering up their respective nodes 132, 134, and 136.

Thus, the example hardware architecture 100 allows the same DC-SCM board and mother boards of each of the nodes to be used for the different SKUs. The example architecture reduces design complexity as common hardware may be used for multiple configurations. Only one BMC firmware image for each of the BMCs is required to support the different SKUs and the specific BMC role for the system configuration. In this manner, the same hardware may be used for multiple configurations, obviating the need for specialized hardware design for different SKUs.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."\Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above-described embodiments. Rather, the scope of the invention should be defined in accordance with the following claims and their equivalents.

What is claimed is:

1. A configurable computer system architecture comprising:
    a power distribution board including a configuration identification strapping;
    an internal communication channel;
    a first node including a first processor and a first baseboard management controller (BMC) coupled to the power distribution board via the internal communication channel; and
    a second node identical to the first node, the second node including a second processor and a second BMC coupled to the power distribution board via the internal communication channel;
    wherein the first and second BMCs are configurable for different configurations read from the configuration identification strapping, the different configurations including a first configuration with the first and second nodes operating as independent devices, where the first and second BMCs serve as master BMCs, or a second configuration with the first and second nodes operating as a single device, where the first BMC serves as a master BMC and the second BMC serves as a slave BMC, wherein firmware on each of the BMCs reads the configuration identification strapping of the power distribution board when each BMC is powered on, and wherein the BMC defined as the master BMC controls the power on of each of the nodes.

2. The computer system architecture of claim 1, wherein each of the first and second nodes include a mother board having dual in line memory modules (DIMM)s accessible by the first or second processor.

3. The computer system architecture of claim 1, further comprising:
    a third node identical to the first node, the third node including a third processor and a third BMC coupled to the power distribution board via the internal communication channel; and
    a fourth node identical to the first node, the fourth node including a fourth processor and a fourth BMC coupled to the power distribution board via the internal communication channel, wherein the different configurations include a third configuration readable by the first, second, third, and fourth BMCs, the third configuration having the four nodes operating as a single device, where the first BMC serves as a master BMC and the other BMCs serve as slave BMCs.

4. The computer system architecture of claim 1, further comprising a network interface, wherein the BMCs are configurable to allow communication to an external device through the network interface, and wherein the master BMC is configured to allow communication through the network interface and the slave BMC is configured to not access the network interface.

5. The computer system architecture of claim 1, wherein the internal communication channel includes a BMC internal ethernet bus, a BMC inter-integrated circuit (I2C) bus, a CPU improved inter-integrated circuit (I3C) bus and a CPU Platform Environment Control Interface (PECI) bus.

6. The computer system architecture of claim 1, wherein the configuration identification strapping is one of an electrically erasable programmable read only memory, a general purpose input output (GPIO) pin, an input/output expander, a complex programmable logic device (CPLD), or a field programable gate array (FPGA).

7. The computer system architecture of claim 1, further comprising an inter-node communication bus coupling the first processor of the first node to the second processor of the second node.

8. The computer system architecture of claim 2, wherein each of the first and second nodes include an additional processor on the mother board.

9. The computer system architecture of claim 2, further comprising firmware on each of the BMCs, wherein the firmware of each of the BMCs defines the master BMC to perform host functions and processor/DIMM management for the first and second nodes and defines the slave BMC to perform sensor monitoring of the second node.

10. The computer system architecture of claim 8, wherein the first and second BMCs are mounted on data center-ready secure control module (DC-SCM) boards.

11. A method of configuring a computer system including a power distribution board, and first and second identical nodes, the first and second nodes each including a baseboard management controller (BMC), the method comprising:
    powering on each of the BMCs, wherein the firmware on each of the BMCs reads the configuration identification strapping of the power distribution board;
    each of the BMCs reading a configuration from a configuration identification strapping on the power distribution board via an internal communication channel;
    configuring each of the BMCs as a slave BMC or a master BMC based on the configuration identification strapping, wherein the configuration may be either a first configuration with the first and second nodes as independent devices and corresponding master BMCs; or a second configuration of a single device with the BMC of the first node as the master BMC and the BMC of the second node as the slave BMC;
    powering on a mother board including processors of the first and second nodes on command of the configured master BMC or master BMCs; and
    performing a management function via the master BMC for the configuration.

12. The method of claim 11, wherein the BMCs are mounted on data center-ready secure control module (DC-SCM) boards.

13. The method of claim 11, wherein the computer system includes a third node identical to the first node, the third node including a BMC; and a fourth node identical to the first node, the fourth node including a BMC, wherein the configuration identification strapping may include a third configuration with four nodes operating as a single device, where the BMC of the first node serves as a master BMC and the other BMCs serves as slave BMCs.

14. The method of claim 11, wherein the BMCs are configurable to allow communication to an external device through the network interface, and wherein the master BMC is configured to allow communication through the network interface and the slave BMC is configured to not access the network interface.

15. The method of claim 11, wherein the management function of the master BMC is a host function and CPU/DIMM management for all nodes of the device.

16. The method of claim 11, further comprising the slave BMC performing a slave management function including sensor monitoring of the second node.

17. The method of claim 11, wherein the internal the internal communication channel includes a BMC internal ethernet bus, a BMC inter-integrated circuit (I2C) bus, a CPU improved inter-integrated circuit (I3C) bus and a CPU Platform Environment Control Interface (PECI) bus.

18. The method of claim 11, wherein the configuration identification strapping is one of an electrically erasable programmable read only memory, a general purpose input output (GPIO) pin, an input/output expander, a complex programmable logic device (CPLD), or a field programable gate array (FPGA).

19. A computer system comprising:
a first node including a first processor and a first baseboard management controller (BMC);
a second node identical to the first node, the second node including a second processor and a second BMC;
a third node identical to the first node, the third node including a third processor and a third BMC;
a fourth node identical to the first node, the fourth node including a fourth processor and a fourth BMC;
a power distribution board providing power to the nodes and including a configuration identification strapping;
a chassis holding the nodes and the power distribution board; and
an internal communication channel allowing communication between the BMCs and the power distribution board, wherein the identification strap is readable by the BMCs to configure the computer system as: 1) four independent devices; 2) as a first device including the first node and the second node, and a second device including the third node and the fourth node, the first and second devices independent of each other; and 3) one device including the four nodes, wherein firmware on each of the BMCs reads the identification strap when each BMC is powered on, and wherein the BMC defined as the master BMC controls the power on of each of the nodes.

* * * * *